(12) United States Patent
Pandya et al.

(10) Patent No.: US 11,675,878 B1
(45) Date of Patent: Jun. 13, 2023

(54) AUTO-LABELING METHOD FOR MULTIMODAL SAFETY SYSTEMS

(71) Applicant: Everguard, Inc., Irvine, CA (US)

(72) Inventors: Sandeep Pandya, Irvine, CA (US); Sundeep Ahluwalia, San Diego, CA (US); Changsoo Jeong, Rancho Palos Verdes, CA (US); Michael Korkin, Glendale, CA (US); Kyungsuk Lee, Rancho Palos Verdes, CA (US); Christopher Ro, Aliso Viejo, CA (US); Yong Wu, Signal Hill, CA (US)

(73) Assignee: Everguard, Inc., Irvine, CA (US)

( * ) Notice: Subject to any disclaimer, the term of this patent is extended or adjusted under 35 U.S.C. 154(b) by 29 days.

(21) Appl. No.: 17/241,718

(22) Filed: Apr. 27, 2021

Related U.S. Application Data

(60) Provisional application No. 63/018,264, filed on Apr. 30, 2020.

(51) Int. Cl.
| | |
|---|---|
| *G06F 18/214* | (2023.01) |
| *G06T 7/73* | (2017.01) |
| *G01S 17/894* | (2020.01) |
| *G01S 17/42* | (2006.01) |
| *G06V 10/22* | (2022.01) |

(Continued)

(52) U.S. Cl.
CPC .......... *G06F 18/2148* (2023.01); *G01S 17/42* (2013.01); *G01S 17/894* (2020.01); *G06F 18/251* (2023.01); *G06T 7/73* (2017.01); *G06V 10/22* (2022.01); *G06V 20/52* (2022.01); *G06V 20/64* (2022.01); *G06T 2207/10028* (2013.01);

(Continued)

(58) Field of Classification Search
CPC .... G06K 9/6257; G06K 9/6289; G06V 20/52; G06V 20/64; G06V 10/22; G06T 2207/10028; G06T 2207/20081

See application file for complete search history.

(56) References Cited

U.S. PATENT DOCUMENTS

| | | | | |
|---|---|---|---|---|
| 2015/0332463 | A1* | 11/2015 | Galera ..................... | G05B 9/03 382/103 |
| 2018/0276841 | A1* | 9/2018 | Krishnaswamy ...... | G06V 10/25 |

(Continued)

OTHER PUBLICATIONS

"AI Insights for a Safer, Healthier and Productive Workforce." WearHealth, wearhealth.com/. Accessed on Apr. 22, 2020.

(Continued)

*Primary Examiner* — David Perlman
(74) *Attorney, Agent, or Firm* — Wilson Sonsini Goodrich & Rosati

(57) ABSTRACT

A multimodal system is provided for managing safety in an industrial environment. The system comprises: a computer vision component for generating a computer vision output data; a real-time locating component for generating location data about an object within the industrial environment; a LIDAR component for generating 3D point cloud data of the industrial environment; and one or more processors coupled to the computer vision component, the real-time locating component and the LIDAR component and configured to: (i) generate label data using the location data and identity about one or more objects generated by the real-time locating component, and (ii) update one or more predictive models utilized by the component vision component or the multimodal system using the label data.

20 Claims, 4 Drawing Sheets

(51) Int. Cl.
*G06V 20/52* (2022.01)
*G06V 20/64* (2022.01)
*G06F 18/25* (2023.01)

(52) U.S. Cl.
CPC .............. *G06T 2207/20081* (2013.01); *G06V 2201/06* (2022.01)

(56) References Cited

U.S. PATENT DOCUMENTS

| | | |
|---|---|---|
| 2019/0209022 A1 | 7/2019 | Sobol et al. |
| 2019/0236370 A1 | 8/2019 | Man |
| 2019/0258251 A1 | 8/2019 | Ditty et al. |
| 2019/0258878 A1 | 8/2019 | Koivisto et al. |
| 2019/0303759 A1 | 10/2019 | Farabet et al. |
| 2020/0202208 A1* | 6/2020 | Li .................... G06N 20/00 |

OTHER PUBLICATIONS

"AI-Powered Workplace Safety." Intenseye, http://www.intenseye.com/. Accessed on Apr. 22, 2020.

Cheng et al. Automated task-level activity analysis through fusion of real time location sensors and worker's thoracic posture data; Automation in Construction 29 (2013) 24-39.

"Connected Safety." Home-HIS, safety.honeywell.com/en-us/software-and-services/connected-safety. Accessed on Apr. 22, 2020.

"Connected Worker Solutions." Intel, http://www.intel.com/content/www/us/en/connected-worker/overview.html. Accessed on Apr. 22, 2020.

Co-pending U.S. Appl. No. 17/241,737, inventors Pandya; Sandeep et al., filed Apr. 27, 2021.

"DeepCanopy." DeepCanopy, http://www.deepcanopy.com/. Accessed on Apr. 22, 2020.

"Guardhat." Guardhat, http://www.guardhat.com/. Accessed on Apr. 22, 2020.

"Hitachi Solutions IoT Service Hub for Worker Safety." Hitachi Solutions, us.hitachi-solutions.com/products/hitachi-solutions-iot-service-hub-for-worker-safety/. Accessed on Apr. 22, 2020.

"Home: Safety First." Safetyfirst, margad.wixsite.com/safetyfirst. Accessed on Apr. 22, 2020.

Mandeljc et al. Tracking by identification using computer vision and radio; Sensors 13:241-273 (2013).

Smartvid.io, Inc. "Minimize Risk across Projects with the Smartvid.io Platform." Minimize Risk across Projects with the Smartvid.io Platform, http://www.smartvid.io/our-platform. Accessed on Apr. 22, 2020.

"Video Analytics Partner." EasyFlow, easyflow.biz/. Accessed on Apr. 22, 2020.

"Worker Insights." Worker Insights | IBM Watson IoT, http://www.ibm.com/internet-of-things/solutions/enterprise-asset-management/worker-insights. Accessed on Apr. 22, 2020.

"Worker Safety." HCL Technologies, http://www.hcltech.com/Internet-of-Things-IoT/our-solutions/worker-safety#an-introduction. Accessed on Apr. 22, 2020.

Zhang et al. A framework of on-site construction safety management using computer vision and real-time location system. International Conference on Smart Infrastructure and Construction 2019 (ICSIC); pp. 327-333; available at http://doi.org/10.icsic.64669.327.

* cited by examiner

AUTO-LABELING METHOD FOR MULTIMODAL SAFETY SYSTEMS

CROSS-REFERENCE TO RELATED APPLICATIONS

This application claims the priority and benefit of U.S. Provisional Application No. 63/018,264, filed on Apr. 30, 2020, the entirety of which is incorporated herein by reference.

BACKGROUND

Safety and risk management in the industrial environment is critical. When safety monitoring is neglected, workplace injuries can result in devastating impact on workers, companies and industries. The alarming fact that 21% of workplace fatalities and injuries occur in construction is an indicator that dramatic safety improvements are needed on jobsites.

Safety and risk management in the industrial environment is challenging. It can encompass various aspects from safety protocol compliance, operational processes administration, collision avoidance, hazardous condition warning, fatigue monitoring, trip and fall detection to behavioral adherence of the workers or personnel. The conventional safety approach deployed in industrial context may rely on a combination of direct human supervision, CCTV monitoring, and passive alerts when safety protocols are breached which may cause clerical overload, lack of real time monitoring, situational awareness and insights into worker activity, machine operations or real-time proactive alerts.

SUMMARY

Recognized herein is a need for methods and systems for managing safety and risk in a hazardous workplace with improved efficiency and accuracy. The present disclosure provides systems and methods for managing safety and risk of personnel performing operations in hazardous environments. In particular, the provided systems and methods utilize artificial intelligence (AI) solution that scans through multi-sensor inputs in real-time and proactively alerts workers and managers to safety concerns. In some embodiments of the disclosure, the provided multimodal safety system includes computer vision, real-time locating system (RTLS), light detection and ranging (LIDAR) system and other sensors (e.g., IMU) to provide a comprehensive coverage for each safety/work zone. The multimodal safety system of the present disclosure merges computer vision, real-time locating, AI, sensor fusion and analytics in combination with multiple sensors to provide real time, actionable oversight that ensures worker safety.

An aspect of the present disclosure provides a multimodal framework or a multimodal safety system. The provided multimodal safety system may be capable of accounting for the variability individuals, deployment environment, or worksites conditions over time. In particular, the predictive model utilized by the computer vision system or the LIDAR system may be dynamically adjusted and tuned to adapt to different individuals, different deployment environment, or different worksites conditions over time with automatically generated supervised features (e.g., labeled data). In some cases, one or more predictive models utilized by the multimodal framework may be continuously updated/retrained without human intervention.

The term "labeled dataset," as used herein, generally refers to a paired dataset used for training a model using supervised learning or semi-supervised learning. The term "label" or "label data" as used herein, generally refers to ground truth data. During a training process, the weights or parameters of a deep learning model (e.g., CNN, DNN) are tuned to approximate the ground truth data thereby learning a mapping from input sensor data to the desired output.

Additionally, the multimodal safety system also provides personal protective equipment (PPE) detection, safety zone compliance and fall detection, and various other functionalities. For example, upon detection of a safety infraction, workers may be immediately notified via haptic feedback on their personal alert device. Alert video and metadata are simultaneously sent to the safety manager portal for post-event analysis and coaching. The personal alert device may be a precise positioning wearable device showing worker and asset locations within less than 1.5 feet and can alert workers of danger zones and restricted areas before accidents happen. The personal alert device may be an industrial-grade wearable device.

Some embodiments of the present disclosure provide a platform allowing for real-time situational awareness and insights into worker activity thereby increasing productivity and ensuring workers are acting within safety requirements. Systems and methods of the present disclosure provide an end-to-end solution that offers actionable insights in real time. Systems and methods of the present disclosure combine computer vision and sensor fusion to provide safety at the edge for precise worker activity recognition. An analytics portal of the platform may deliver continuous safety data to help recognize improvements in worker behavior and operations management, as well as maintenance of equipment, and software applications running on the edge and the cloud.

The real-time platform of the present disclosure may cooperate ultra-accurate and reliable wearables with computer vision, machine learning and AI to improve productivity and safety. The platform may be configured for managing workplace safety and risk, detecting, predicting and managing risks in the industrial environment. The platform may comprise a multimodal industrial safety system utilizing machine learning and AI technologies to optimize fusion of multimodal data. In some embodiments of the disclosure, the multimodal safety system may utilize three different sensory modalities: a computer vision component, a real-time locating component, and a LIDAR component.

Each of the three modalities may have their own advantages and disadvantages. It is desirable to provide an intelligent system to fuse these modalities in an optimized manner to improve the accuracy and efficiency of providing a 3D scene map with understanding of the scene (e.g., location tracking, identity recognition, collision avoidance, fall and trip detection, accident or risk detection and prediction, etc.) thereby causing an appropriate action such as the delivery of individual or group alerts to workers, as well as other actions (e.g., interventions, control commands to machines to change operation state, etc.) to improve industrial safety.

Computer vision (CV) techniques or computer vision systems have been used to process images to extract high-level understanding of the scene (e.g., industrial workplace, construction site, etc.). CV techniques may have the capabilities of object detection, object tracking, action recognition or generating descriptions of a scene (e.g., object detection, object classification, extraction of the scene depth and estimation of relative positions of objects, extraction of objects' orientation in space, anomaly detection, detection of an unsafe situation, etc.). However, CV systems are known to have limited accuracy such as due to limited computational power. For example, deep convolutional neural networks are known to improve accuracy with an increased number of network layers. One source of inaccuracy in computer vision is the limited computational power, constrained by cost, size, weight, power, and heat dissipation. Another source of inaccuracy in computer vision is the limited resolution. An effective system resolution is a product of the intrinsic and extrinsic factors. Intrinsic factors may include, for example, optical blur of the camera's lens, focal length, and the spatial sampling rate of the image sensor. Extrinsic factors include illumination of the scene and its dynamic range. Target image brightness under given illumination is typically achieved by setting the exposure time. Longer exposure causes motion blur as a result of object motion or camera physical motion thereby reducing effective system resolution. To avoid motion blur, target image brightness may be achieved by increasing or decreasing the imaging system's gain. Increased gain amplifies signal noise which similarly reduces the effective system resolution. Furthermore, the location tracking by individual's identification is more challenging in industrial context or uniformed environments where individuals become visually indistinguishable due to similar uniform (e.g., PPE) which may result in errors in identity tracking.

Real-time locating system (RTLS) may automatically identify and track the location of objects or people in real time, usually within a building or other contained area. RTLS may involve using wireless RTLS tags attached to objects or worn by people, and in most RTLS, fixed reference points receive wireless signals from tags to determine their location. However, inaccuracy in the RTLS measurement can be caused by multi-path reflections of radio waves from objects in the scene, poor antenna sensitivity, weak radio signal strength, obstructions and occlusions in the line of sight between transceivers and signal attenuation by large metal objects.

Light detection and ranging (LIDAR) technology can be used to obtain three-dimensional information of an environment by measuring distances to objects. In contrast to the real-time locating systems that provide sparse scene coverage representing locations of a small number of mobile tags present in the scene (e.g., trajectories of individuals), LIDAR can provide a substantially dense three-dimensional representation of the scene. However, inaccuracy in LIDAR system may be caused by obstructions and occlusions in the line of sight which may lead to potential misclassification of environment and resolution in the 3D space.

The multimodal safety system or platform may combine the three different sensory modalities i.e., a computer vision component, a real-time locating component, and a LIDAR component via an intelligent fusion framework. In some embodiments, the multimodal safety system or platform may combine at least four different sensory modalities i.e., a computer vision component, a real-time locating component, a LIDAR component and inertial measurement unit (IMU) data via an intelligent fusion framework. In some cases, the multimodal safety system may be capable of detecting objects' locations in the scene and identifying them by utilizing mobile tag data provided by the real-time locating component and then tracking objects' orientation, relative positions and boundaries in three dimensions in real-time by using LIDAR point cloud data and camera images. In some cases, a proximity between two or more objects in the scene as determined by the system from mobile tag data, camera images and LIDAR data may cause an alert delivered to an individual worker or a group if such proximity falls below set thresholds to prevent a collision.

In some cases, the provided systems and methods may help individuals or workers to comply with safety protocols, improve situational awareness for hazardous environments and conditions, and enforce pro-active safety behaviors based on real-time tracking and unsafe situation detection.

In one aspect of the present disclosure, a multimodal system for managing safety in an industrial environment is provided. The multimodal system comprises: a computer vision component for generating a computer vision output data; a real-time locating component for generating location data and identification data about an object within the industrial environment; and one or more processors coupled to the computer vision component, and the real-time locating component. The one or more processors are configured to: generate a label data using the location data and the identification data about the object, create a first paired training dataset including the label data and an image data obtained by the computer vision component, and update one or more predictive models utilized by the component vision component using the first paired training dataset.

In some embodiments, the multimodal system further comprises a light detection and ranging (LIDAR) component for generating a 3D point cloud data of the industrial environment. In some cases, the one or more processors are configured to further create a second paired training dataset including the label data and the 3D point cloud data. For example, the second paired training dataset is used to update a predictive model utilized by the LIDAR component. In some cases, the one or more processors are configured to further receive a data stream including the computer vision output data, the location data generated by the real-time locating component and the 3D point cloud data, and process the data stream using a machine learning algorithm trained model to generate a safety related result and feedback data.

In some embodiments, the real-time locating component comprises one or more reference point devices deployed within the industrial environment to provide a coverage at least partially overlaps with a view of the computer vision component. In some embodiments, the real-time locating component includes a mobile tag device deployed to the object. In some cases, the mobile tag device comprises a motion sensor collecting motion data about the object.

In some embodiments, the computer vision output data comprises a description of the industrial environment. In some embodiments, the first paired training dataset is created by registering the identification data about the object to an object from the image data based at least in part on the location data.

In a related yet separate aspect, a method for managing safety in an industrial environment is provided. The method comprises: providing a computer vision component for generating a computer vision output data; providing a computer vision output data for generating location data and identification data about an object within the industrial environment; generating a label data using the location data and the identification data about the object; creating a first paired training dataset including the label data and an image data obtained by the computer vision component; and updating one or more predictive models utilized by the component vision component using the first paired training dataset.

In some embodiments, the method further comprises providing a light detection and ranging (LIDAR) component for generating a 3D point cloud data of the industrial environment. In some cases, the method further comprises creating a second paired training dataset including the label data and the 3D point cloud data. For instance, the method further comprises updating a predictive model utilized by the LIDAR component using the second paired training dataset. In some cases, the method further comprises receiving a data stream including the computer vision output data, the location data generated by the real-time locating component and the 3D point cloud data, and processing the data stream using a machine learning algorithm trained model to generate a safety related result and feedback data.

In some embodiments, the real-time locating component comprises one or more reference point devices deployed within the industrial environment to provide a coverage at least partially overlaps with a view of the computer vision component. In some embodiments, the real-time locating component includes a mobile tag device deployed to the object. In some cases, the mobile tag device comprises a motion sensor collecting motion data about the object.

In some embodiments, the computer vision output data comprises a description of the industrial environment. In some embodiments, creating the first paired training dataset comprises registering the identification data about the object to an object identified from the image data based at least in part on the location data.

Example embodiments are described with reference to the management and monitoring of safety in an industrial environment (e.g., construction site). However, it is to be understood that the invention itself is more broadly applicable, and other example embodiments may be applied to the tracking of persons and objects and providing safety alert and actions in any place that may or may not be a workplace.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
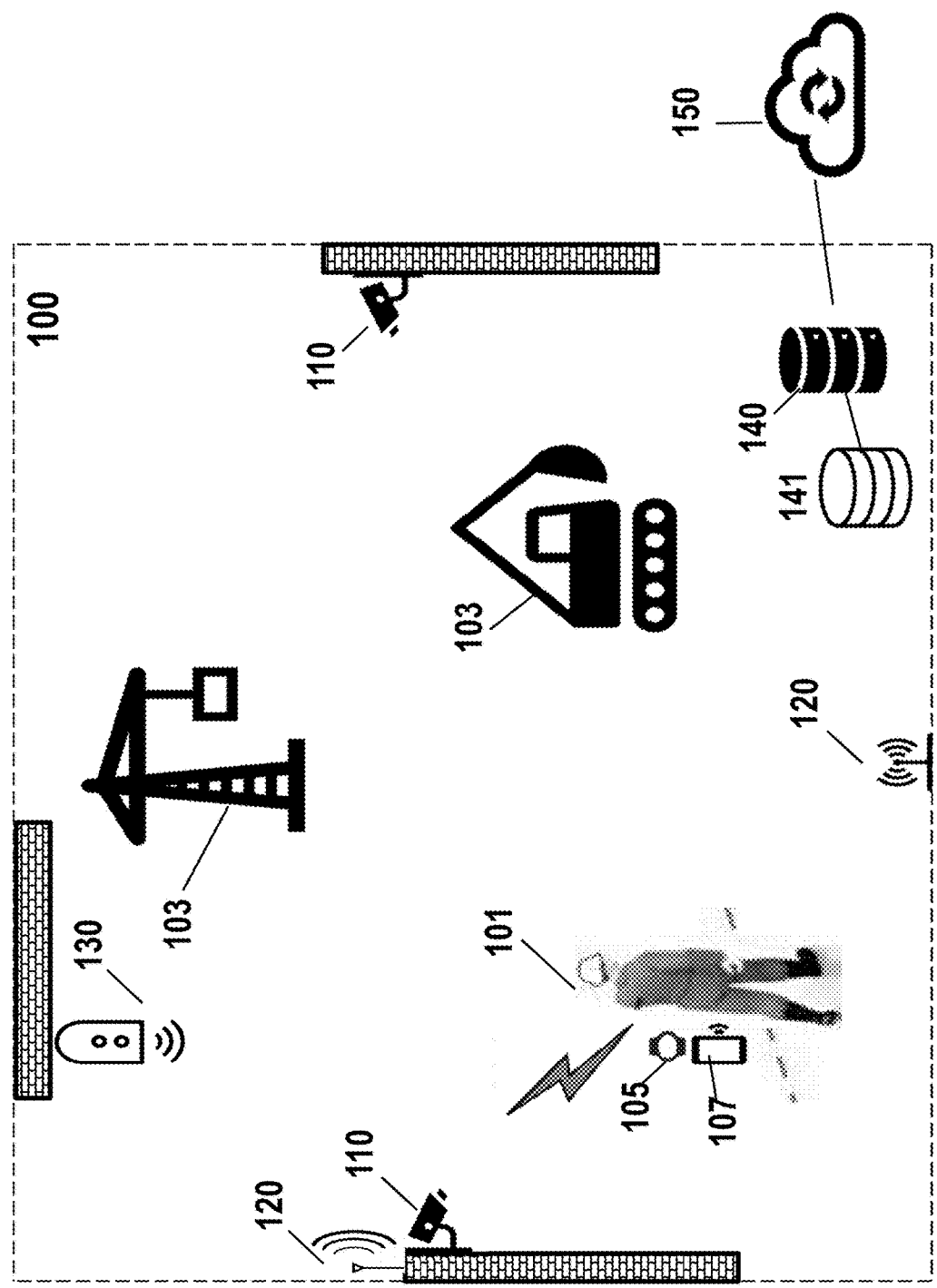
FIG. 1 schematically illustrates a multimodal safety system implemented in an industrial environment, in accordance with some embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Certain Definitions

Unless otherwise defined, all technical terms used herein have the same meaning as commonly understood by one of ordinary skill in the art to which this invention belongs.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form The term "real-time," as used herein, generally refers to a response time of less than 1 second, tenth of a second, hundredth of a second, a millisecond, or less, such as by a computer processor. Real-time can also refer to a simultaneous or substantially simultaneous occurrence of a first event with respect to occurrence of a second event. One or more operations in the present disclosure can be performed in real-time or near real-time.

The present disclosure provides methods and systems for safety management in a hazardous environment. The hazardous environment may be a remote workplace, an indoor workplace, an outdoor workplace, a place where hazardous work is conducted such as an industrial environment, a construction site, manufacturing plants and various others that can be dynamic, complex, and hazards can arise from the unsafe behavior of on-site personnel and/or equipment (e.g., machines, vehicles, etc.). The present disclosure may provide situational awareness functionality, safety management based on location tracking and unsafe situation detection that may be used in various contexts, including construction site, shipping, mining, healthcare, manufacturing environments and various other industries. The real-time location tracking, behavior enforcement and situational awareness functionality of the present disclosure may be used for various uses, such as Internet of Things (IoT) platforms, health-monitoring software applications and business processes or industrial workplace management, and for organizations in energy, manufacturing, aerospace, automotive, chemical, pharmaceutical, telecommunications, healthcare, the public sector, and others.

Multimodal Safety System

The present disclosure provides systems and methods for managing safety in a hazardous workplace. In particular, the provided systems and methods can be applied to safety and risk detection or management related to various aspects of industrial workplace including, for example, worker's safety behavior change or guide, real-time alert or warning to workers, safety control of equipment to avoid collision or accident, location tracking of workers, materials or equipment's within a construction site, situational awareness of hazardous work, safety protocol compliance, and dealing with accidents and other events happening to the workers during operation.

The multimodal safety system may be a location and/or time-based system that may utilize real-time multimodal sensor data for incident detection, location tracking per identification, alerting, triggering safety operation of machines, and safety behavior compliance. In some cases, the multimodal safety system can analyze data collected from multi-modal sensory systems or devices to generate contextual descriptions of 3D scene which may include object detection, object classification, extraction of the scene depth and estimation of relative positions of objects, extraction of objects' orientation in space, anomaly detection, detection of an unsafe situation, identify safety operation processes, capture worker-based metrics (e.g., fatigue level, health condition, under-stress, physiological state, etc.), detect an incident (e.g., trip, slip or fall detection), identify a hazardous situation or hazardous conditions in a work zone of a workplace, identify an efficient workflow for one or more workers and one or more groups within a workplace and various others.

In other embodiments, multimodal sensory data may be collected from a computer vision system, a real-time locating system (RTLS), a LIDAR system and wearable sensors worn by or attached to personnel performing tasks within a workplace. The sensor data, processed data, and related data flow may be communicated over a network suitable for use in an industrial environment that may be indoor environment, outdoor environment, or a combination of both. In some cases, the environment may be dynamically changing (e.g., construction site). In some cases, the environment may be a remote area with limited wireless Internet or cellular network access, or an area without connection to a wide area network ("WAN") or an inter-network (e.g., the Internet).

This multimodal safety system may fuse the multimodal sensory data dynamically based on real-time conditions which beneficially improves the accuracy and efficiency of providing understanding of the 3D target scene with reduced computation overhead and/or computational power. The multimodal system may be capable of adapting to real-time conditions by employing a framework that is capable of dynamically adjusting the computing power allocated to the multimodal sensory systems and/or dynamically allocating resources for sensory data acquisition to further improve the safety monitoring performance of the system.

FIG. 1 schematically illustrates a multimodal safety system implemented in an industrial environment 100. The multimodal safety system may comprise a set of connected devices, one or more physiologic or kinematic sensors 105, an edge gateway (e.g., edge computing device/server) 140 for processing data collected from the multimodal sensory devices/systems 110, 120, 130 and providing real-time feedback to an individual 101 or user (e.g., onsite manager), and a backend management system 150 (e.g., cloud server).

In some embodiments of the present disclosure, the multimodal safety system may employ an edge intelligence paradigm that data processing and prediction/inference is performed at the edge or edge gateway 140 while the predictive models may be built, developed and trained on the backend management system 150 residing on a cloud/data center and run on a user device (e.g., hardware accelerator) deployed at the scene 100 and/or the edge computing device 140 for inference. For instance, sensor data stream may be sent to the on-site edge computing device 140 in real-time for managing on-site operations, safety and risk within a construction site, whereas a message package comprising batch data may be sent to a remote management console or the cloud at a lower frequency for post-event analysis. In some instances, the edge computing device may implement a multimodal framework. Details about the multimodal framework and data processing are described later herein. In some embodiments of the present disclosure, the management system 150 may comprise a predictive model creation and management system and/or automated data labeling engine. Details about the predictive model creation and management system and/or automated data labeling engine are described later herein.

In some cases, at least part of the multimodal safety system may be deployed in a hazardous worksite such as a construction site. In some situations, the worksite may be facilitated with local area network but may have limited wireless Internet or cellular network access particularly when the worksite is in a remote area that is remote from a wide area network ("WAN") or an inter-network (e.g., the Internet), or when the worksite is a temporary or dynamic worksite without sufficient network coverage. The worksite may have indoor and outdoor area or work/safety zones where operations, tasks and duties are performed.

Operations or tasks performed by one or more individuals 101 (e.g., workers, operators) may be tracked and guided based on real-time sensor data and feedbacks. In further embodiments of the disclosure, at least part of the sensor data may be captured by the multimodal sensory systems and one or more sensors from a user's electronic device, such as user's wearable device, mobile tag devices 105, and the like.

In some embodiments, an individual 101 (e.g., operator, worker) may be associated with one or more sensors. In some cases, an individual may be associated with one or more types of sensors that can be located on the individual's body (e.g., attached to skin), a part of body (e.g., wearable device or mobile tag devices 105) or clothing (e.g., PPE). In some cases, the one or more types of sensors may be located remotely from an individual, such as deployed in an environment (e.g. wall-mounted, attached to a machine, vehicle or other equipment, etc.) or located on a user device.

The user device may be a wearable device or a mobile tag device 105 provided to a worker 101. The user device may provide precise tracking of the individual 101 such as a mobile tag device. In some cases, the user device may be a precise positioning wearable device showing worker and asset locations within less than 1.5 feet and can alert workers of danger zones and restricted areas before accidents happen. The user device may be an industrial-grade wearable device. The user device may include other computing devices that are capable of presenting feedback information to a user. Examples of user devices may include, but are not limited to, mobile devices, smartphones/cellphones, tablets, personal digital assistants (PDAs), laptop or notebook computers, desktop computers, media content players, virtual reality systems, augmented reality systems, or microphones. The user device may be any electronic device capable of analyzing, receiving user input data (e.g., receiving user input for an incident report or trigger an emergency alert, etc.), providing or displaying certain types of feedback data (e.g., adverse event statistics, alert, behavior change cue, etc.) to a user. In some cases, a manager user device may be provided to one or more managers, supervisors or users allowing the them to monitor and view the real-time safety condition in the worksite.

In preferable embodiments of the present disclosure, the multimodal sensory systems and devices may comprise at least a computer vision-based system 110, a RTLS 120, 105 and LIDAR system 130. The multimodal sensory systems may further include various types of sensors carried/worn by or attached to the individuals 101 or an equipment 103. For example, one or more types of sensors may be included in a mobile tag device 105 worn by or attached to the individuals 101 or an equipment 103 (e.g., machine, vehicle, construction site equipment, asset, etc.).

In some embodiments of the present disclosure, the mobile tag device 105 may serve as a radio transmitter as part of the RTLS component for tracking identification/location of the individual 101 and/or equipment 103. For example, the mobile tag devices 105 may be BLE compatible or ultra-wideband (UWB) compatible so as to determine an individual's or mobile equipment's relative physical location to a beacon. In some cases, the mobile tag device 105 may be a precise positioning wearable device showing worker and asset locations within less than 1.5 feet and can alert workers of danger zones and restricted areas before accidents happen. The mobile tag device 105 may be an industrial-grade wearable device.

In yet another embodiment of the present disclosure, the mobile tag device 105 may include sensors such as physiologic sensors, kinematic sensors, audio sensors, inertial sensors (e.g., accelerometers, gyroscopes, and/or gravity detection sensors, which may form inertial measurement units (INIMUs)), location sensors (e.g., global positioning system (GPS) sensors, mobile device transmitters enabling location triangulation), heart rate monitors, external temperature sensors, skin temperature sensors, skin conductance, neural signals (e.g. EEG), muscle signals (e.g. EMG), capacitive touch sensors, sensors configured to detect a galvanic skin response (GSR), vision sensors (e.g., imaging devices capable of detecting visible, infrared, or ultraviolet light, such as cameras), proximity or range sensors (e.g., ultrasonic sensors, lidar, time-of-flight or depth cameras), attitude sensors (e.g., compasses), pressure sensors (e.g., barometers), humidity sensors, vibration sensors, audio sensors (e.g., microphones), and/or field sensors (e.g., magnetometers, electromagnetic sensors, radio sensors). Sensor data provided by the mobile tag device may be analyzed along with the data collected from the multimodal sensory components to further improve the accuracy and understanding of the worksite safety conditions.

In some embodiments, the mobile tag device 105 may comprise one or more sensors for detecting a position, orientation or motion state (e.g., speed, acceleration, etc.) of an individual who wears the mobile tag device or a movable object carries the mobile tag device. Such sensor data may provide an additional modality to the multimodal sensory system. The one or more sensors may include at least an inertial measurement member. The inertial measurement member may comprise one or more gyroscopes, velocity sensors, accelerometers, magnetometers, and one or more location sensors. The inertial sensor may be used for obtaining data indicative of a spatial disposition (e.g., position, orientation, or angle) and/or motion characteristic (e.g., translational (linear) velocity, angular velocity, translational (linear) acceleration, angular acceleration) of the movable object. An inertial sensor may be used herein to refer to a motion sensor (e.g., a velocity sensor, an acceleration sensor such as an accelerometer), an orientation sensor (e.g., a gyroscope, inclinometer), or an IMU having one or more integrated motion sensors and/or one or more integrated orientation sensors. An inertial sensor may provide sensing data relative to a single axis of motion. The axis of motion may correspond to an axis of the inertial sensor (e.g., a longitudinal axis). A plurality of inertial sensors can be used, with each inertial sensor providing measurements along a different axis of motion. For example, three angular accelerometers can be used to provide angular acceleration data along three different axes of motion. The three directions of motion may be orthogonal axes. One or more of the angular accelerometers may be configured to measure acceleration around a rotational axis. As another example, three gyroscopes can be used to provide orientation data about three different axes of rotation. The three axes of rotation may be orthogonal axes (e.g., roll axis, pitch axis, yaw axis). Alternatively, at least some or all of the inertial sensors may provide measurement relative to the same axes of motion. Such redundancy may be implemented, for instance, to improve measurement accuracy. Optionally, a single inertial sensor may be capable of providing sensing data relative to a plurality of axes. For example, an IMU including a plurality of accelerometers and gyroscopes can be used to generate acceleration data and orientation data with respect to up to six axes of motion.

In some cases, the mobile tag device (e.g., wearable device 105) may be capable of delivering an alert (e.g., vibration, audio alarm, etc.) in response to a detection of an incident (e.g., trip, fall), an intervention for changing behavior (e.g., fatigue detection or heat exhaustion) or forecasting a hazardous situation (e.g., prediction of an impending adverse event in a work zone or a physiological condition of the individual). For example, upon the prediction of an impending adverse event (e.g., entering a hazardous work zone, reaching a fatigue level, etc.), intervention such as rhythmic cue, audio, visual, or tactile stimulus may be delivered to the worker via the wearable device, mobile tag device 105 or sensors. In another example, upon detection of a safety infraction, workers may be immediately notified via haptic feedback on the mobile tag device 105. The alert video and metadata may be simultaneously sent to the safety manager portal for post-event analysis and coaching on the remote entity 150.

As described above, in some cases, the multimodal safety system may comprise connected sensors deployed in various locations within the environment 100 for detecting a hazardous situation or adverse event in the environment and providing warning or feedback information. In some situations, the environment may be a worksite that can have various regions or work zones which can be associated with a plurality of sensors deployed therein. The plurality of sensors may comprise cameras, LIDAR device and transceivers as part of the computer vision-based system 110, a RTLS component 120, 105 and LIDAR system 130. In some cases, sensors deployed within the worksite can further include, for example, a navigation system of a mobile worksite (e.g., vessel or ship) such as radar, sonar, differential global positioning system (DGPS), sensors on a user device such as inertial measurement unit (IMU), gyroscopes, magnetometers, accelerometers, audio sensors, conductivity sensors, ambient environment sensors such as temperature/heat sensors, chemical sensors, biological sensors, radiation sensors, or any other type of sensors, or combination thereof. The plurality of sensors deployed throughout the target scene may be used to detect ambient environment condition in a work zone, and/or work in conjunction with the sensor or user devices for location and time-based tracking, incident detection, and providing situational awareness to the individuals 101.

The computer vision-based system 110 may include one or more imaging devices (e.g., cameras) deployed at the worksite. Imaging devices may be deployed on stationary structures, such as the walls of the building, or on mobile equipment, such as cranes and vehicles. In some cases, the imaging device may be a video camera. The camera may comprise optical elements and image sensor for capturing image data. The image sensors may be configured to generate image data in response to wavelengths of light. A variety of image sensors may be employed for capturing image data such as complementary metal oxide semiconductor (CMOS) or charge-coupled device (CCD). In some cases, the image sensor may be provided on a circuit board. The circuit board may be a printed circuit board (PCB). The PCB may comprise a plurality of electronic elements for processing the image signal. For instance, the circuit for a CMOS sensor may comprise A/D converters and amplifiers to amplify and convert the analog signal provided by the CMOS sensor. Optionally, the image sensor may be integrated with amplifiers and converters to convert analog signal to digital signal such that a circuit board may not be required. In some cases, the output of the image sensor or the circuit board may be image data (digital signals) that can be further processed by a camera circuit or processors of the camera. In some cases, the image sensor may comprise an array of optical sensors.

In some cases, the camera may be a plenoptic camera having a main lens and additional micro lens array (MLA). The plenoptic camera model may be used to calculate a depth map of the captured image data. In some cases, the image data captured by the camera may be grayscale image with depth information at each pixel coordinate (i.e., depth map). The camera may be calibrated such that intrinsic camera parameters such as focal length, focus distance, distance between the MLA and image sensor, pixel size and the like are obtained for improving the depth measurement accuracy. Other parameters such as distortion coefficients may also be calibrated to rectify the image for metric depth measurement. The depth measurement may then be used for generating a 3D scene map and may be complemented by data provided by the RTLS component and LIDAR system.

As described above, the camera or the computer vision-based system 110 may perform pre-processing of the capture image data. In an embodiment, the pre-processing algorithm can include image processing algorithms, such as image smoothing, to mitigate the effect of sensor noise, or image histogram equalization to enhance the pixel intensity values. In some cases, one or more processors of the computer vision-based system 110 may use optical approaches as described elsewhere herein to generate a depth map of the target scene 100. For instance, an application programming interface (API) of the computer vision-based system 110 may output a focused image with depth map. Alternatively, the depth map may be generated by a safety inference engine of the system by fusing LIDAR data and camera data The RTLS component 120 may include a plurality of RTLS reference points, which can be transmitters, receivers, or transceivers, deployed throughout the workplace 100 to provide the desired mobile tag coverage. The RTLS reference points may be a plurality of devices such as Beacon devices for indoor/outdoor positioning or wireless communication. In some cases, the local network may allow for indoor/outdoor position tracking, such as populating the indoor/outdoor space with Bluetooth Low Energy (BLE) beacons and GPS trackers or alternatively UWB anchors, or both UWB and GPS that transmit a continuous stream of packets that are picked up by a BLE transceiver or an UWB transceiver or a GPS transceiver on the mobile tag device 105 or the wearable device.

For instance, with BLE, a position of mobile tag devices 105 (e.g., wearable devices) can be identified based on the proximity technology. The proximity technology may include a plurality of beacons distributed about a premise through which an individual 101 or mobile equipment 103 is located or to navigate. The mobile tag devices 105 may be BLE compatible so as to determine an individual's or mobile equipment's relative physical location to a beacon. Based on ranging data or approximate distance between user's device to each beacon along with the unique beacon's properties, different level of positioning accuracy can be achieved. For instance, the proximity technology may determine the location of a mobile tag devices 105 based on a proximity estimate of signal strength emitting from beacon. In addition, it can be enhanced with a beacon triangulation method to determine the (x, y, z) local map coordinates of individual's position referencing to three or more beacons in proximity. The receiver can estimate its position using average of x, y, z localized coordinates of a floor map for e.g. (x1, y1, z1), (x2, y2, z2) and (x3, y3, z3). The RTLS component may employ any suitable ranging and/or angulating methods which may include, for example, angle of arrival, angle of departure, line-of-sight, time of arrival, time difference of arrival, two-way ranging, symmetrical double sided two way ranging, near-field electromagnetic ranging or any combination of the above.

The RTLS component may utilize any suitable technologies to provide real-time locating. For instance, the RTLS may employ ultra-wideband (UWB) technologies, ultrasound-based RTLS technologies, GPS-enabled RTLS, Wireless local area network, Bluetooth, and various other technologies to provide location tracking or proximity measurement. The accuracy may range from, for example, 0.1 m to 10 m. The RTLS component may select any combination of the aforementioned technologies to accommodate the deployment environment (e.g., indoor, outdoor, LAN availability, power consumption, accuracy requirement, etc.).

In some cases, the deployment of wireless radio transmitters (e.g., BLE sensors) within the worksite (e.g., construction site) may be designed to complement the deployment of the cameras of the computer vision system. A plurality of Beacon devices may be placed in various indoor locations, outdoor locations, or a combination of both. Deployment of the RTLS reference points may be designed such that the coverage of the RTLS component may at least partially overlap with the view of the computer vision system. This may beneficially supplement the location tracking per identity data to the descriptions of the 3D scene generated by the computer vision system.

The LIDAR (light detection and ranging) system 130 may obtain three-dimensional information of the target scene by measuring distances to objects. The LIDAR system 130 may comprise one or more LIDAR devices deployed throughout the worksite. The emitter of a LIDAR device may generate a sequence of light pulses emitted within short time durations such that the sequence of light pulses may be used to derive a distance measurement point. The LIDAR system may provide three-dimensional (3D) imaging (e.g., 3D point cloud) or further analysis (e.g., obstacles detection).

The LIDAR system may comprise one or more LIDAR devices deployed to any suitable locations within the worksite 100. The LIDAR system 130 may generate 3D point cloud data and/or analysis result (e.g., detection of an obstacle, detection of a collision, etc.). In some cases, the LIDAR system 130 may be configured to detect changes in the target scene (e.g., construction site) that may be relevant to safety of the workspace. For example, the changes detected by the LIDAR system may include new structures getting erected or taken down (i.e., construction progress), equipment installed or removed, materials delivered or removed from the scene, and other changes. Dynamic tracking of changes of the target scene may be utilized to estimate the precise location of workers in the target scene and the proximity between objects.

It is noted that the local network can have various other configurations or utilize other suitable techniques. For example, instead of or in addition to Beacons, proximity sensors such as radio or RFID beacons, Global Positioning System (GPS) beacons, wireless location beacons, or other reference features may be provided within an indoor area. The reference features may include visually discernible markers, IR-discernible markers, UV-discernible markers, and/or beacons that may emit a wireless signal. The wearable device may be equipped with the corresponding sensors (e.g., camera) to track the location of an individual relative to the location of the reference features.

As mentioned above, the multimodal safety system may employ an edge intelligence paradigm that data processing and inference is performed at the edge or edge computing server 140 (e.g., on-site server) while the predictive models may be built, developed and trained on a cloud/data center 150, and run on the edge computing server 140, user device such as dashboard tablet for onsite managers (e.g., hardware accelerator), personnel device (e.g., wearable device, mobile tag device 105) for inference.

In some cases, data managed or transmitted to the on-site edge computing server 140 may include, for example, data streams from the multimodal sensory systems/components, data from the personnel device such as the mobile tag device 105 or wearable device (e.g., motion data, physiological data, etc.) and/or user input data (e.g., user initiated report of an incident, alert, etc.). In some cases, data transmitted from the edge computing server 140 to the multimodal sensory systems/components may include control signals or instructions to adjust one or more parameters of the computer vision component or LIDAR component for sensory data acquisition (e.g., scanning pattern of LIDAR, zoom factor, tilt-pan control of cameras, etc.) and/or instructions related to image processing performed by the computer vision component.

In some cases, data may be transmitted from the edge computing server 140 to the personnel device which may include, for example, alert, warning, feedback instructions/guidance of worker behaviors or navigational information that is generated by the edge computing server 140. In some cases, the data generated by the edge computing server 140 may include warning signal or interventions to the individuals 101 or the equipment 103 (e.g., machines, vehicles, asset, etc.). For example, the data may include interventions delivered to the associated individual or control signals to an equipment. For instance, the interventions may comprise operations instructions/guidance to a worker in compliance with safety laws or protocols, and the control signals to an equipment may include a command to shut down or change a machine state of the equipment to avoid collision or other hazardous events. For example, the control signals may be delivered through machine's or equipment's PLC (programmable logic controller).

In optional cases, an additional user device 107 (e.g., tablet, mobile device) may be provided to a user. Alternatively, the user device may be the mobile tag device 105. The user device may be in communication with the edge computing server 140. Data transmitted from the user device to the edge computing server 140 may include, for example, user inputted data (e.g., confirmation of a task is completed), report provided by the worker, user-triggered alert (e.g., emergency alert) or a type of emergency. An individual or worker may also be permitted to trigger an alert via the user device or the mobile tag device. Data transmitted from the edge computing server to the user device may include, for example, alert, real-time information about a hazardous situation in the worksite, interventions and others as described above.

The edge computing server 140 may analyze the multimodal data streams with aid of an intelligent framework including one or more predictive models and/or anomaly detection models, the output result may be an alert indicating a detected incident such as fall or trip, or an anomaly, or a prediction of an impending adverse event such as a hazardous condition in a work zone, and various other functionalities as described later herein. The edge computing server 140 may be coupled to a local database 141.

The local database 141 may comprise storage containing a variety of data consistent with disclosed embodiments. For example, the databases may store raw data collected from the user device 105, 107 (e.g., sensors and wearable device), data collected from the multimodal sensory systems 110, 120, 130, individual's or worksite's historical data, data about a predictive model (e.g., parameters, hyper-parameters, model architecture, threshold, rules, etc), data generated by a predictive model (e.g., intermediary results, output of a model, latent features, input and output of a component of the model system, etc.), incident report, record, workflow, safety protocols/law or regulatory related data, and user provided information (e.g., confirmation or denial of a prediction result, user information such as name, credential, or other user profile data, etc), algorithms, and the like. In certain embodiments, one or more of the local databases may be co-located with the edge computing server, may be co-located with one another on the local network, or may be located separately from other local devices. One of ordinary skill will recognize that the disclosed embodiments are not limited to the configuration and/or arrangement of the database(s).

The local database 141 may be one or more memory devices configured to store data. Additionally, the databases may also, in some embodiments, be implemented as a computer system with a storage device. In one aspect, the databases such as the local database and cloud databases may be used by components of the multimodal safety system to perform one or more operations consistent with the disclosed embodiments. One or more cloud databases and local database of the platform may utilize any suitable database techniques. For instance, structured query language (SQL) or "NoSQL" database may be utilized for storing the data transmitted from the edge computing system or the local network such as real-time data (e.g., location data, motion data, audio/video data, messages, etc.), processed data such as report, alert, historical data, predictive model or algorithms. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for semantic queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some cases, batch data, and/or individual records, report and the like may be generated by the edge computing server. Some of the data may be stored in the local database 141, while some of the data may be transmitted to a remote cloud 150.

The remote cloud 150 may comprise one or more cloud applications such as a management console or cloud analytics portal that can be accessed by superintendents, managers, directors, auditors or third-party entities. For example, upon detection of a safety infraction, workers may be immediately notified via haptic feedback on their personal alert device (e.g., wearable device, mobile tag device, etc.). Alert video and metadata may be simultaneously sent to a safety manager portal of the management console for post-event analysis and coaching. The analytics portal may deliver continuous safety data to help recognize improvements on worker behavior and operations management, as well as maintenance of devices, applications running on the edge computing server and on the cloud. The third-party entity may access the cloud data repository or cloud applications for various purposes such as internal auditors, construction site state control inspection and various others.

Data captured by the multimodal sensory systems, wearable device, user devices, as well as real-time feedback data and management data may be communicated via a network architecture well-suited for use in an industrial environment. In some cases, the network architecture may comprise a local network that is within the worksite. The local network may employ a topology or configuration capable of operating in challenging environments where obstructions or distance prevent wireless communication from a device to a hub. For example, the local network may employ industrial grade WiFi Mesh technology providing stronger and more reliable Wi-Fi signals. Alternatively, or in addition to, the local network may be a mesh network where devices communication with each other without a centralized device, such as a hub, switch or router.

In some embodiments, the network architecture may comprise interconnect infrastructure or fabric such as purpose-built hardware, herein referred to as "gateways," which are compatible with a wireless protocol. The local network may have stationary configuration or dynamic configuration as described above, and the real-time data may be transmitted to the edge computing server 140 for analysis. The edge computing server 140 may be local to the worksite. The edge computing server 140 may be in communication with a remote cloud/data center 150 through the gateways for downloading trained predictive models, and transmitting data such as report data (e.g., incident report, data collected from the multimodal sensory system, etc.) and various others for further analysis and management. For instance, sensor data stream may be transmitted to the edge computing server 140 in real-time for managing worksite operations, safety and risk, whereas a message package comprising batch data may be sent to the cloud at a lower frequency. Details about the remote management system and edge computing system are described later herein.

In some embodiments, the local network may be a combination of wired and wireless network. In some embodiments, the local network may comprise a WiFi-beacon configuration. For example, the network configuration may comprise one or more WiFi Mesh access points and one or more beacons deployed within the worksite. The network of devices may be deployed to provide full network coverage at the worksite. In some cases, the deployment of the network devices may be determined based on the layout (e.g., indoor/outdoor layout) of the worksite, safety zone or work zone (e.g., location where tasks to be performed) such that a reliable network coverage is provided in the workplace. The plurality of sensors and/or mobile tag devices carried by the individuals or an equipment may be in communication with the edge computing device and/or a remote entity (e.g., cloud) via the wireless network. In some cases, the local network may comprise a communication unit such as a WiFi controller or switch responsible for deciding a data path or data link according to a routing table. The network may also comprise a gateway connecting the local network to a remote network or network entity (e.g., cloud). The gateway device may provide long range RF wireless coverage (e.g., DLPWAN) to connect the local network. The gateway devices may allow long range communications. In some cases, the long-range RF wireless coverage may be a narrowband wireless network coverage. In some cases, the gateway devices may employ any suitable coding or modulation scheme such as binary shift keying (BSK), direct sequence spread spectrum (DSSS), frequency hopping spread spectrum, or Gauss frequency-shift keying (GFSK), Quadrature Amplitude Modulation (QAM) or quadrature phase shift keying (QPSK), power amplification, forward error correction (FEC) and, various other data transmission methods. In some cases, the gateway devices may switch power amplification, bandwidth, and/or bitrate in real-time to optimize for signal quality, transmission rate, and/or battery life.

In some cases, the gateways may connect to a wide area network (e.g., Internet) or cloud using any TCP/IP or UDP-based capable backhaul, such as Ethernet, Wi-Fi or cellular 4G or 5G. The gateways may contain a radio frontend capable of listening to several MHz of RF wireless spectrum at a time, and/or configured to hear all network traffic transmitted within that spectrum. In some cases, the gateways may use synchronized frequency hopping schemes.

In some embodiments, the local network may be a combination of wired and wireless network. In some embodiments, the network configuration may comprise a plurality of Wi-Fi access points connected to a plurality of network switches or hubs (e.g., Ethernet switch), and one or more beacons. One or more Wi-Fi access points may be cable wired to one or more Ethernet switches. The plurality of network switches may be wire/cable connected to a power source. The network may also comprise a gateway such as the IS (Internet service) Wi-Fi access point to connect the local network to a remote network (e.g., Internet) or network entity.

In some embodiments, the local network may also comprise a plurality of devices such as Beacon devices for indoor/outdoor positioning or wireless communication. In some cases, the local network may allow for indoor/outdoor position tracking, such as populating the indoor/outdoor space with Bluetooth Low Energy (BLE) beacons that transmit a continuous stream of packets that are picked up by a BLE sensor on the mobile device or the wearable device.

Additionally, the network configuration may be dynamic. For example, one or more of the network devices may not be stationary within the worksite. In another example, the network configuration may be dynamically changing. In some cases, the local network may be a mesh network. In a mesh network, devices communication with each other without a centralized device, such as a hub, switch or router. In some cases, the network may be connected to a mesh network formed by a plurality of the sensors, mobile tag devices, or the wearable devices. The wireless mesh network may employ any suitable protocol, such as Wi-Fi, Bluetooth, BLE, Bluetooth Mesh, ZigBee, body area network (BAN), IrDA, ultra wide band (UWB), etc. For example, a Wi-Fi mesh network may be used to facilitate data transfer between the plurality of sensors and wearable devices. Sensory data collected by sensors located at different places may be transferred by hopping from one sensor to another until it reaches a destination (e.g., a local control unit, a central device, user device, gateway, etc.) according to a predetermined protocol across the mesh network. In some cases, a sensor in the mesh network may comprise a communication unit such as a Wi-Fi controller responsible for deciding a data path or data link according to a routing table. The mesh network may be low power consumption. The mesh network may be robust and reliable when a sensor is added or removed from the mesh network. A configuration of the mesh network may be configured to automatically adapt to an addition or removing of a sensor of the network. In some cases, the formation of a mesh network may not require a human set up. For example, once a sensor is placed on a wall surface or indoor room of a building, the sensor module may be automatically detected and become part of the mesh network. For instance, the sensor may check its routing table and other sensors in proximity to decide a data transfer path.

Multimodal Safety Framework

An aspect of the present disclosure provides a multimodal framework. The provided multimodal safety system may be capable of accounting for the variability individuals, deployment environment, or worksites conditions over time. In particular, one or more trained predictive models utilized by the computer vision system or the LIDAR system may be dynamically adjusted and tuned to adapt to different individuals, different deployment environment, or different worksites conditions over time with automatically generated supervised features (e.g., labeled data). In some cases, one or more predictive models utilized by the multimodal framework may be continuously updated/re-trained without human intervention.

The term "labeled dataset," as used herein, generally refers to a paired dataset used for training a model using supervised learning. The term "label" or "label data" as used herein, generally refers to ground truth data. During a training process, the weights or parameters of a deep learning model (e.g., CNN) are tuned to approximate the ground truth data thereby learning a mapping from input sensor data to the desired output. The auto-labeling techniques of the present disclosure may beneficially allow for automatic updating/refining of a trained model based on newly collected sensor data after deployment of a model. For instance, after a model is trained and deployed to an environment, the model may be continuously updated by tuning the parameters/weights based on the sensor data stream without human intervention (e.g., creating label data). Alternatively or additionally, the auto-labeling techniques may be applied in the model training and development stage.

In some cases, the one or more trained predictive models utilized by the computer vision system, the LIDAR system or the multimodal framework may be dynamically adjusted and tuned to adapt to the individuals, deployment environment, or worksites conditions over time with automatically generated label data. For example, the label data along with image data may be used as input features for training the predictive or detective model for the computer vision system. In another example, the training dataset may include the label data, image data and 3D point cloud data for training a predictive or detective model of the multimodal framework.

In some embodiments of the present disclosure, the label data may be generated based at least in part on an output of the RTLS component. For instance, the label data may be generated according to the identity and location of an object provided by the RTLS component and the object is registered to the image data from the computer vision system or 3D point cloud data from the LIDAR system. Additionally, the label data may be generated using data collected from the motion sensors or inertial measurement unit onboard the mobile tag device. For instance, the label data may be generated using data about a position, orientation or motion state (e.g., speed, acceleration, etc.) of an object that carries the mobile tag device.

In some cases, the one or more predictive models may be trained, developed, updated, and managed by a management system. In some cases, the management system may perform continual training or improvement after deployment. In some cases, the predictive or detective model utilized by the multimodal system or framework may be improved or updated continuously over time (e.g., during implementation, after deployment). Such continual training and improvement may be performed automatically with little user input. The management system can be applied in various scenarios such as in cloud or an on-premises environment. Details about the management system, automated label generation, or continuous model training/retraining are described later herein.

Figure 2:
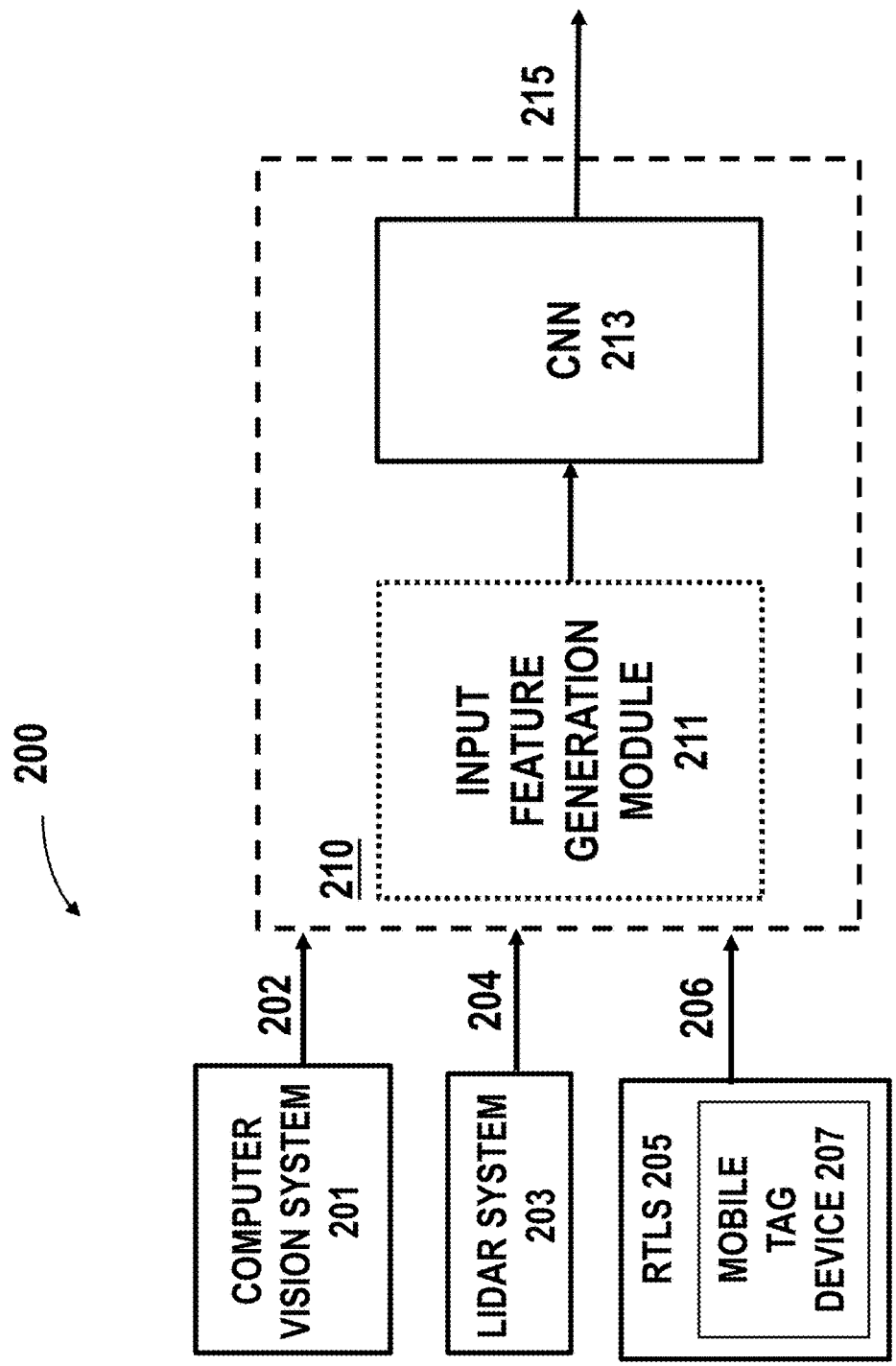
FIG. 2 schematically shows a block diagram of a multimodal framework, in accordance with some embodiments of the present disclosure.

FIG. 2 schematically shows a block diagram of a multimodal framework 200, in accordance with some embodiments of the present disclosure. The multimodal framework 200 may be configured to process multimodal sensory data to generate an output for safety purpose. In some embodiments, the multimodal sensory data may be collected from a computer vision system 201, a LIDAR system 203 and a RTLS system 205, and processed by an intelligent safety inference engine 210 to produce an output 215. In some cases, the multimodal sensory data may further include data collected from one or more sensors (e.g., IMU, motion sensors, etc.) of the mobile tag device 207 for detecting a position, orientation or motion state (e.g., speed, acceleration, etc.) of an individual who wears the mobile tag device or a movable object carries the mobile tag device.

In some embodiments of the multimodal safety system, the predictive or detective model utilized by the computer vision system 201, the LIDAR system 203 or the inference engine 210 may be continuously updated and tuned using automatically generated label data. In some cases, the label data may be generated based on the real-time output of the RTLS component such as the identity and location of an object and/or position, orientation or motion state (e.g., speed, acceleration, etc.) of an object provided by the mobile tag device 207.

In some embodiments, the output 215 of the safety inference engine 210 may include safety related results such as a detected or predicted accident or adverse event within the target scene (e.g., construction site). The safety related results may include, but not limited to, detection of an incident (e.g., trip, slip, fall), detection of impeding collision, detection of fatigue level, predicting/forecasting a hazardous zone or condition and various others. As an example, the output may be detection and tracking of a large piece of moving equipment, such as a crane with a variable three-dimensional shape and orientation in space relative to other objects present in the target scene, including workers wearing mobile tags, other mobile and stationary equipment, and the building structures that have no tags attached thereto.

In some cases, the output 215 may cause action such as an alert, warning, guidance delivered to the associated individual via the wearable device or mobile tag device. For example, action may include warnings about a hazardous condition on a worksite which can be generated and delivered to the individual prior to the individual entering the hazardous work zone or to warn the individual about a collision event. In some cases, an impeding hazardous event or hazardous condition may be predicted or forecasted. For example, the safety inference engine may be capable of forecasting an impeding adverse event a certain timespan before the occurrence of the event. The forecasting or prediction of an impending adverse event may be generated using a trained model.

In some embodiments, a warning signal and interventions can be proactively suggested. For example, the output 215 may further include interventions delivered to the associated individual or control signals to an equipment. For instance, the interventions to the workers may comprise workflow or operations instructions/guidance to a worker, training or coaching, navigational information to guide the worker within a construction site and the like. The interventions to the machines or equipment in a worksite may include, for example, control signals to the equipment to shut down or change a machine state of the equipment to avoid collision or other hazardous events. Control signals to the equipment may be delivered as commands to PLC (programmable logic controller) which controls the equipment.

The output 215 may be generated by the safety inference engine 210. In some embodiments, the safety inference engine 210 may include an input feature generation module 211 and a trained predictive model 213. For example, the detection of an incident (e.g., trip, slip, fall, collision), detection of behavior not in compliance with safety protocol (e.g., not wear PPE), detection of fatigue level, predicting a hazardous zone or condition may be provided using the predictive model 213. A predictive model may be a trained model or trained using machine learning algorithm. The machine learning algorithm can be any type of machine learning network such as: a support vector machine (SVM), a naïve Bayes classification, a linear regression model, a quantile regression model, a logistic regression model, a random forest, a neural network, convolutional neural network CNN, recurrent neural network RNN, a gradient-boosted classifier or repressor, or another supervised or unsupervised machine learning algorithm (e.g., generative adversarial network (GAN), Cycle-GAN, etc.). The predictive model may be trained, developed, continual trained-retrained by a predictive model creation and management system as described elsewhere herein.

In some cases, the multimodal safety system may generate control signals/command to control one or more imaging devices of the computer vision component and/or data processing of the computer vision component based on other modality sensory data. For example, the multimodal safety system may receive the RTLS output data including location/trajectory tracking of an object of interest (e.g., worker, equipment, etc.), and in response to determining the identity and location of an object is available, the multimodal safety system may generate an instruction to a computer vision component about image processing to be performed to the object. For instance, the instruction may include a coordinate of the region of interest in the field of view presenting the identified object, and particular image processing methods to be performed within the region of interest. For example, if the identity indicates the object of interest is a worker, the instruction may indicate not to perform facial recognition on the object whereas object/action recognition may be performed to identify a behavior of the worker. For instance, behavior identification or action/object recognition may be performed to verify if the worker's behavior/actions comply with a safety protocol such as whether the worker wears a PPE or whether the operations are in compliance. In some cases, the image processing methods to be performed may be determined based on the identity of the object of interest. In some cases, upon determining the specific task to be performed on the recognized object (e.g., behavior identification, action classification, object recognition, PPE identification, etc.), the computational power/resource such as CPU/GPU cores or the accelerator for performing the specific task may be assigned to execute the program instructions.

The input feature generation module 211 may generate input feature data to be processed by the trained predictive model 213. In some embodiments, the input feature generation module 211 may receive data from the computer vision system 201, the LIDAR system 203, and the real-time locating system 205, extract features and generate the input feature data. In some embodiments, the data 202, 204, 206 received from the computer vision system, the LIDAR system, and the RTLS may include raw sensor data (e.g., image data, LIDAR data, time-series location data, identity data, IMU data, etc.). In some cases, the input feature generation module 211 may pre-process the raw sensor data (e.g., data alignment, data registration, image registration, etc.) generated by the multiple different sensory systems (e.g., sensors may capture data at different frequency, different view points/angles/field of views, etc.) or from different sources (e.g., third-party application data). For example, data captured by camera, LIDAR, RTLS and telemetry data (e.g., temperature, physiologic data, IMU data, etc.) may be aligned with respect to time and/or identification (e.g., device ID, worker ID, equipment ID, etc.). This may beneficially allow least some of the functionalities of the CV system to be replaced by or supplemented by the RTLS or LIDAR system. For instance, accuracy and efficiency of detecting and identifying objects in the scene via computer vision may be advantageously complemented by utilizing the location data of such objects and the object identities as provided by the RTLS. For example, the identity of a person wearing a tag in the field of view may be determined based on the mobile tag ID without performing CV techniques to detect the person or perform facial recognition from captured image. In another example, the identity of an equipment may be determined based on the mobile tag ID without performing object recognition techniques (i.e., CV techniques).

In some cases, spatial alignment may be performed to align the multiple types of sensor data. For example, 3D point clouds data generated by the LIDAR system, and the object identity and location data or motion data generated by the RTLS component may be registered to the 3D scene map generated by the computer vision system. The data/image registration may be performed using various suitable methods such as intensity-based or feature-based methods, methods based on known transformation models, similarity features-based method, and various other methods. In some cases, the identification information from the RTLS may be used as the ground truth data for training a model to recognize an object from the camera image (CV model).

The data 202 generated by the computer vision (CV) system 201 may include descriptions of the target scene (e.g., construction site) such as object detection, 3D scene map, object classification, extraction of the scene depth and estimation of relative positions of objects, extraction of objects' orientation in space, anomaly detection, detection of an unsafe situation, or other descriptions. In some cases, the data 202 provided by the computer vision system may be generated using an optical technique that may not be as computationally expensive as using the computer vision system alone. At least some of the functionalities of the computer vision system can be replaced by or supplemented by the RTLS or LIDAR system. For instance, accuracy and efficiency of detecting and identifying objects in the scene via computer vision may be advantageously complemented by utilizing the location data of such objects and the object identities as provided by the RTLS. For example, the identity of a person wearing a tag in the field of view may be determined based on the mobile tag ID without performing CV techniques to detect the person or perform facial recognition from captured image.

The computer vision system 201 may adopt any suitable optical techniques to generate the computer vision (CV) output data 202 (e.g., 3D or depth information of the target scene). For example, the CV output data may be generated using passive methods that only require images, or active methods that require controlled light to be projected into the target scene. Passive methods may include, for example, thermal image acquisition, object recognition, stereoscopy, monocular shape-from-motion, shape-from-shading, and Simultaneous Localization and Mapping (SLAM) and active methods may include, for example structured light and Time-of-Flight (ToF). In some cases, computer vision techniques such as optical flow, computational stereo approaches, iterative method combined with predictive models, machine learning approaches, predictive filtering or any non-rigid registration methods may be used to generate the descriptions of the 3D scene.

The optical techniques may employ one or more trained predictive models to generate the output data 202. The one or more predictive models can be trained using any suitable deep learning networks. For example, the deep learning network may employ U-Net architecture which is essentially a multi-scale encoder-decoder architecture, with skip-connections that forward the output of each of the encoder layers directly to the input of the corresponding decoder layers. As an example of a U-Net architecture, upsampling in the decoder is performed with a pixelshuffle layer which helps reducing gridding artifacts. The merging of the features of the encoder with those of the decoder is performed with pixel-wise addition operation resulting in a reduction of memory requirements. The residual connection between the central input frame and the output is introduced to accelerate the training process.

The deep learning model can employ any type of neural network model, such as a feedforward neural network, radial basis function network, recurrent neural network, convolutional neural network, deep residual learning network and the like. In some embodiments, the deep learning algorithm may be convolutional neural network (CNN). The model network may be a deep learning network such as CNN that may comprise multiple layers. For example, the CNN model may comprise at least an input layer, a number of hidden layers and an output layer. A CNN model may comprise any total number of layers, and any number of hidden layers. The simplest architecture of a neural network starts with an input layer followed by a sequence of intermediate or hidden layers, and ends with output layer. The hidden or intermediate layers may act as learnable feature extractors, while the output layer may output the improved image frame. Each layer of the neural network may comprise a number of neurons (or nodes). A neuron receives input that comes either directly from the input data (e.g., low quality image data etc.) or the output of other neurons, and performs a specific operation, e.g., summation. In some cases, a connection from an input to a neuron is associated with a weight (or weighting factor). In some cases, the neuron may sum up the products of all pairs of inputs and their associated weights. In some cases, the weighted sum is offset with a bias. In some cases, the output of a neuron may be gated using a threshold or activation function. The activation function may be linear or non-linear. The activation function may be, for example, a rectified linear unit (ReLU) activation function or other functions such as saturating hyperbolic tangent, identity, binary step, logistic, arcTan, softsign, parameteric rectified linear unit, exponential linear unit, softPlus, bent identity, softExponential, Sinusoid, Sinc, Gaussian, sigmoid functions, or any combination thereof. During a training process, the weights or parameters of the CNN are tuned to approximate the ground truth data thereby learning a mapping from the input raw image data to the desired output data (e.g., identity of object, location, orientation of an object in a 3D scene).

In some embodiments, the deep learning model may be trained using supervised learning or semi-supervised learning. For example, in order to train the deep learning network, pairs of datasets with input image data (i.e., images captured by the camera) and desired output data (e.g., ground truth/label) may be generated by a training module of the system as training dataset. The training datasets may comprise automatically generated label data. For instance, RTLS output data such as location and identity of an object, and/or motion and orientation of an object obtained from the IMU (of the mobile tag device) may be processed to generate the label data for training a model utilized by the CV system or the LIDAR system. In some cases, pairing the RTLS data with the image data may include registering an object recognized/identified in the image data with an object tracked by the RTLS (e.g., RFID). The object recognized/identified in the image data may include location information such as movement of an object without identification information.

The LIDAR (light detection and ranging) system 203 may obtain three-dimensional information of the target scene by measuring distances to objects. In some cases, the LIDAR system 203 may include one or more LIDAR devices for providing three-dimensional (3D) imaging (e.g., 3D point cloud) or perform further analysis (e.g., obstacles detection or collision avoidance).

The data 204 received from the LIDAR system may comprise LIDAR output data such as 3D point cloud data and/or analysis result (e.g., detection of an obstacle, detection of a collision, etc.). The LIDAR system 203 can be the same as the LIDAR component as described in FIG. 1. In some cases, the analysis performed by the LIDAR system (e.g., obstacle detection, collision detection) may employ one or more predictive or detective models. The predictive or detective models may be trained using supervised learning. For example, in order to train the deep learning network, pairs of datasets with input 3D point cloud data and desired output data (i.e., ground truth/label data) may be generated by a training module of the management system as training dataset. The training datasets may comprise automatically generated label data. For instance, RTLS output data such as location and identity of an object, and/or motion and orientation of an object obtained from the IMU may be processed to generate the label data and paired with the 3D point cloud data. As described above, the pairing may include registering an object recognized/identified in the 3D point cloud with an object tracked by the RTLS (e.g., RFID). The object recognized/identified in the 3D point cloud may include only location information without identification information. The registration may be based on spatial information such as location of the object measured in the 3D point cloud and the location of the object measured by the RTLS. The identification data about the object obtained from the RTLS may then be used as the label/ground truth data for the 3D point cloud data.

The RTLS 205 may generate RTLS output data 206 by processing the radio signals as described above using one or a combination of ranging and/or angulating methods to determine location. The ranging and/or angulating methods may include, for example, angle of departure, line-of-sight, time of arrival, time difference of arrival, two-way ranging, symmetrical double sided two way ranging, near-field electromagnetic ranging or other methods as described in FIG. 1. The RTLS 206 can be the same as the RTLS component as described in FIG. 1. For example, the RTLS may include a plurality RTLS reference points devices (e.g., transmitters, receivers, transceivers), deployed throughout the target scene to provide the desired mobile tag coverage as well as a plurality of mobile tags attached to the individuals and/or equipment (e.g., vehicles, machines, asset, etc.) within the scene.

The RTLS may include a plurality of mobile tag devices 207. The mobile tag device can be the same as the mobile tag device as described in FIG. 1. For example, the mobile tag device 207 may comprise one or more sensors for detecting a position, orientation or motion state (e.g., speed, acceleration, etc.) of an individual who wears the mobile tag device or a movable object carries the mobile tag device. Such sensor data may provide an additional modality to the multimodal sensory system. The one or more sensors may include at least an inertial measurement member. The inertial measurement member may comprise one or more gyroscopes, velocity sensors, accelerometers, magnetometers, and one or more location sensors as described elsewhere herein.

In some embodiments, the RTLS output data 206 may comprise at least time-series of location data (e.g., proximity data), identification data (e.g., device ID, worker ID, equipment ID, etc.) and the motion data (e.g., IMU data). In some cases, the RTLS output data 206 may be captured at the same frequency and/or time points as capturing the image data by the CV system or the LIDAR system (e.g., same time stamp) such that the RTLS output data may be used to generate label data for training the CV system predictive or detective model or LIDAR system predictive or detective model. Alternatively, the RTLS output data 206 may not be captured at the same sampling frequency or at the same timepoints to the CV system or LIDAR system sensor data, techniques such as interpolation or data registration may be utilized to align the different types of data to form a paired training dataset.

The functions, methods or the one or more components described (e.g., input feature generation module, inference engine) may be implemented using software, hardware or firmware or a combination thereof. For example, the components may comprise one or more processors and at least one memory for storing program instructions. As used herein a processor encompasses one or more processors, for example a single processor, or a plurality of processors of a distributed processing system for example. A controller or processor as described herein generally comprises a tangible medium to store instructions to implement steps of a process, and the processor may comprise one or more of a central processing unit, programmable array logic, gate array logic, or a field programmable gate array, for example. In some cases, the one or more processors may be a programmable processor (e.g., a central processing unit (CPU) or a microcontroller), a graphic processing unit (GPU), digital signal processors (DSPs), a field programmable gate array (FPGA) and/or system on chip (SoC). In some cases, the one or more processors may be operatively coupled to a non-transitory computer readable medium. The non-transitory computer readable medium can store logic, code, and/or program instructions executable by the one or more processors unit for performing one or more steps. The non-transitory computer readable medium can include one or more memory units (e.g., removable media or external storage such as an SD card or random access memory (RAM)). One or more methods, algorithms or operations disclosed herein can be implemented in hardware components or combinations of hardware and software such as, for example, ASICs, special purpose computers, or general-purpose computers.

Auto-Labeling Method and Mechanism

One or more predictive models of the multimodal safety system are trained using supervised learning algorithm or semi-supervised learning algorithm. In some embodiments of the present disclosure, the ground truth data or label data may be generated automatically with little human intervention.

Figure 3:
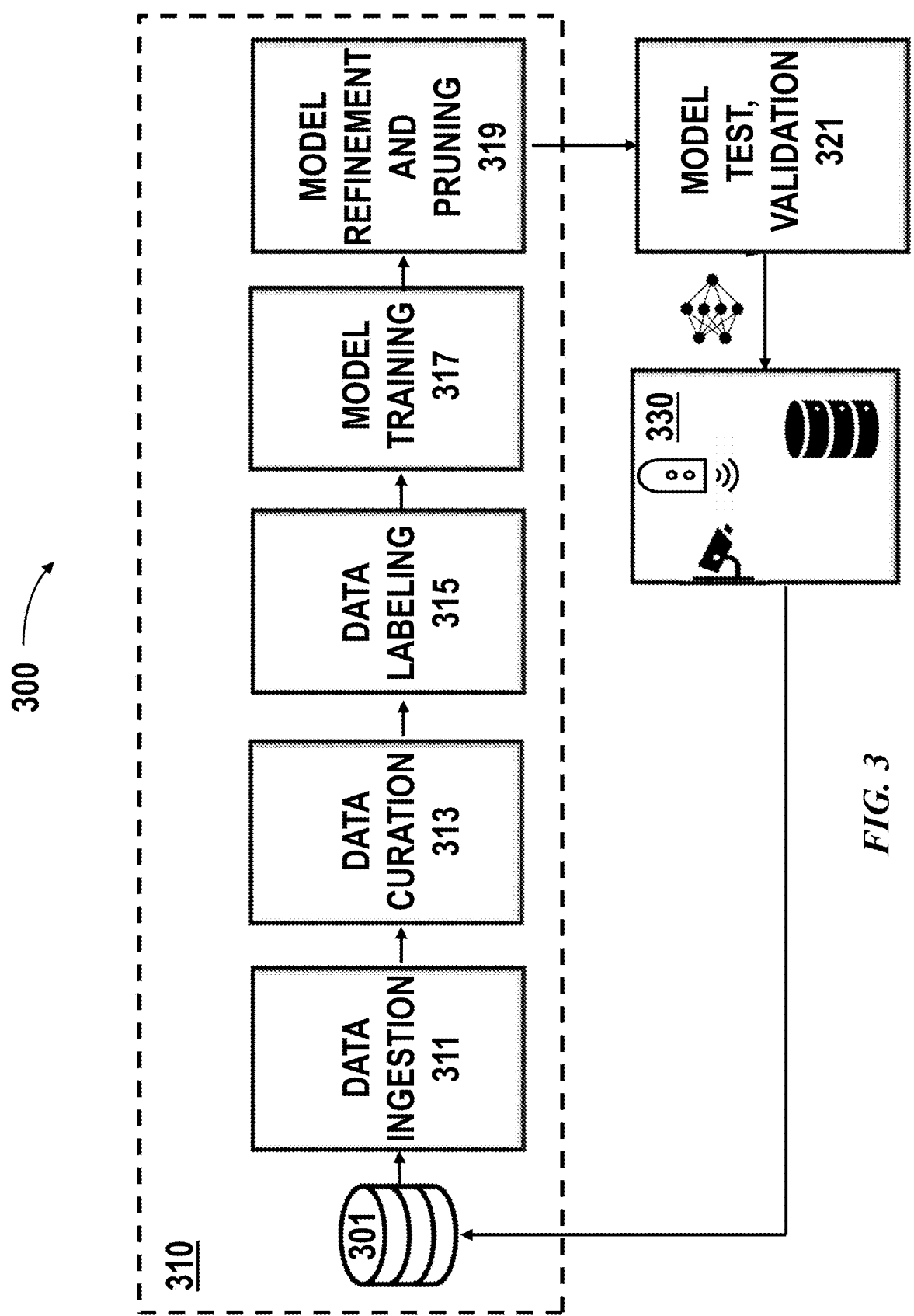
FIG. 3 illustrates an example of a process of testing, training, verifying, and/or validating neural networks, in accordance with some embodiments of the present disclosure.

FIG. 3 illustrates an example of a process 300 of testing, training, verifying, and/or validating neural networks, in accordance with some embodiments of the present disclosure. The process 300 may include data ingestion of new sensor data captured and/or generated by the multimodal sensory systems in real-world environments 311. The process 300 may further include data indexing and curation 313, data labeling 315, model training 317, model refinement, pruning, and/or fine tuning 319, model validation 321, model deployment, and/or updating training data store 301 with newly captured sensor data. The process 300 may include a training loop, whereby new data is generated by the multimodal safety system 330, used to train, test, verify, and/or validate one or more deep learning models, and the trained or deployed deep learning models are then used by the multimodal safety system 330 to generate the safety result.

The data store(s) 301 may store data generated by the multimodal safety system 330, raw sensory data captured by the multimodal sensory systems, and/or training datasets obtained from other sources, respectively.

Data ingestion 311 may include generating and/or recording the data output by the multimodal safety system and the captured sensor data (e.g., raw image data captured by the imaging device, etc.). The data ingestion process may process data that is being ingested in streams or in batch. The data may include, for example, data generated by multimodal safety system such as the safety related output/result 215 (e.g., warning, alert, control signal to a controller of the machine deployed to the construction site), output of each sensor system 202, 204, 206, sensor data (e.g., IMU, camera, LIDAR, mobile tag device, proximity sensor, etc.), geolocation data, and various others as described elsewhere herein. The stream data may comprise a variety of types of data including, without limitation: time series data such as spatio-temporal point measurements generated by the RTLS component, multi-dimensional data such as measurements from LIDAR system or computer vision system, visualization data such as 3D scene map generated by the computer vision system, metadata, raw data such as raw input data from sensors, user device, digital services, processing analysis, and various others. The batches may be tenant specific, application specific, such as warning, alert generated by the multimodal safety system, a floor map of a construction site or others.

Data indexing and curation 313 may include indexing metadata associated with the sensor data or output of the multimodal safety system for further search and/or retrieval. Search indexes may be used to retrieve specific segments of the data, which may then be tagged and/or flagged for further processing. In some examples, raw data may be stored in a lossless format to allow for further pre-processing and/or quantization. In such examples, an on-demand transcoding service may transform the raw data into various target formats (e.g., MPEG, JPEG, FP16, etc.) and may feed or input the transformed data to one or more processing pipelines (e.g., labeling, DNN training, retraining, etc.). Exported datasets may be stored in a dataset store, which may be a service that handles immutable datasets for further processing. Once the datasets are stored, the datasets may be used and re-used to reproduce training results exactly, or to continual train or retrain predictive models.

Data labeling 315 may involve generating label data. As described above, the label data may be used as ground truth for model training. Data labeling may, for example, label the image data captured by the computer vision system or 3D point cloud captured by the LIDAR system with labels (e.g., identification of an object) generated based on the RTLS output data or IMU data. For instance, label data may be generated using RTLS output data having the same time stamp to the camera image data or 3D point cloud data. In some cases, a label such as an identification of an object from the RTLS may be registered to an object in the image data/3D point cloud data based on location information. For instance, the location information of an object tracked by the RTLS, an object recognized from the camera image data and/or the 3D point cloud data may be used to register the object of interest. In contrast, the conventional manual labeling requires that a human labeler identifies and marks up objects in camera images or 3D point cloud data.

Model training 317 may use a deep-learning platform to define training applications and to run the training application on a compute cluster. The compute cluster may include one or more GPU-powered servers that may each include a plurality of GPUs, PCIe switches, and/or CPUs, interconnected with high-speed interconnects such as NVLink and PCIe connections. In some examples, a local cache (high-bandwidth scaled out file system) may be available next to the compute cluster and used to cache datasets next to the compute nodes. The system may handle the caching and may provide a local dataset to the compute job. The training applications may produce trained models and metadata that may be stored in a model data store for further consumption.

Model refinement, pruning, and/or fine tuning 319 may include updating the DNNs to further refine and improve the accuracy and efficacy of the DNNs. For example, hyper-parameter discovery may be enabled to track information on the hyper-parameter space to explore hyper-parameter configurations, metrics, and model versions generated by each experiment. Operations such as model pruning and compression may be performed to improve inference speed. Model pruning may comprise deleting nodes of the trained neural network that may not affect network output. Model compression may comprise using lower precision network weights such as using floating point 16 instead of 32. This may beneficially allow for real-time inference (e.g., at high inference speed) while preserving model performance.

Model test, validation 321 may include verifying and/or validating the CNN or DNNs. One or more of the trained models may be evaluated with a testing data set during the model test or validation process. In some case, once the models are trained, the models may be reloaded into a larger application and run other test datasets. The predictive models once pass the test or validation process may be deployed to the multimodal safety system 330.

In some cases, the newly collected sensor data may be used to continually train or retrain one or more of the predictive models. The retraining or training process may involve using label data that is generated automatically without human intervention. The abovementioned processes may be performed by a backend management system. The backend management system can be the same as those described in FIG. 1.

In an aspect of the present disclosure, a safety management platform is provided for generating real-time feedback, controlling work flow, detecting, predicting and managing risks in a workplace, and managing predictive models deployed to one or more multimodal safety systems. In some cases, the safety management platform may include a backend management system for training one or more predictive models. In some cases, the backend management system may perform continual training or improvement after deployment. In particular, the predictive model utilized by the computer vision system or LIDAR system may be dynamically adjusted and tuned to adapt to different individuals, different deployment environment, or different worksites conditions over time with automatically generated supervised features (e.g., labeled data). In some cases, one or more predictive or detective models utilized by the multimodal framework may be continuously updated/retrained without human intervention. The safety management platform may also allow remote supervisors and managers, or remote entities to monitor adverse event occurrence. The backend management system can be applied in various scenarios such as in cloud or an on-premises environment.

Figure 4:
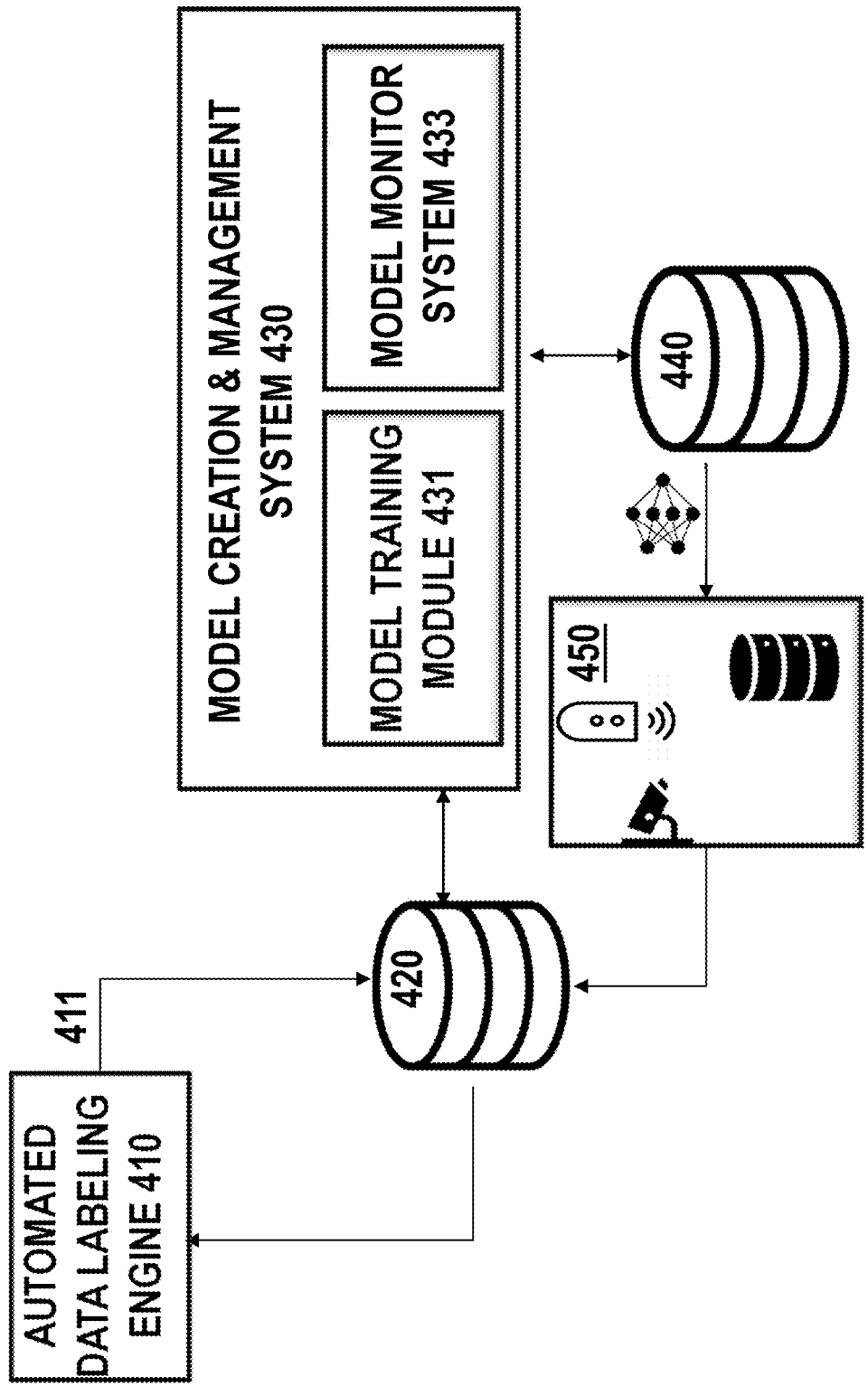
FIG. 4 illustrates an example of a predictive model creation and management system, in accordance with some embodiments of the present disclosure.

The management system may include a predictive or detective model creation and management system configured to train and develop predictive or detective models. FIG. 4 illustrates an example of a predictive or detective model creation and management system 430, in accordance with some embodiments of the present disclosure. In some cases, the trained predictive or detective models may be deployed to one or more multimodal safety systems 450 or an edge infrastructure through a predictive or detective model update module of the predictive or detective model creation and management system 430. The predictive or detective model update module may monitor the performance of the trained predictive or detective models (e.g., computer vision models, safety inference engines) after deployment and may retrain a model if the performance drops below a pre-determined threshold. In some cases, the predictive or detective model creation and management system may also support ingesting real-time data transmitted from the one or more multimodal safety systems 450 or other data sources into one or more databases or cloud storages (e.g., training data store) 420 for continual training of one or more predictive models.

In some cases, a predictive or detective model creation and management system 430 may include services or applications that run in the cloud or an on-premises environment to remotely configure and manage the multimodal safety systems 450. This environment may run in one or more public clouds (e.g., Amazon Web Services (AWS), Azure, etc.), and/or in hybrid cloud configurations where one or more parts of the system run in a private cloud and other parts in one or more public clouds.

In some embodiments of the present disclosure, the predictive or detective model creation and management system 430 may comprise a model training module 431 configured to train, develop or test a predictive or detective model using data from the cloud data lake and/or metadata database 420. the model training process may comprise processes and operations as described in FIG. 3. In some cases, the model training process may comprise operations such as model pruning and compression to improve inference speed.

In some cases, the predictive or detective model creation and management system 430 may comprise model monitor system that monitors data drift or performance of a model in different phases (e.g., development, deployment, prediction, validation, etc.). The model monitor system may also perform data integrity checks for models that have been deployed in a development, test, or production environment (e.g., construction site).

The model monitor system may be configured to perform data/model integrity checks and detect data drift and accuracy degradation. The process may begin with detecting data drift in training data and prediction data. During training and prediction or detection, the model monitor system may monitor difference in distributions of training data, test, validation and prediction or detection data, change in distributions of training data, test, validation and prediction or detection data over time, covariates that are causing changes in the prediction output, and various others.

In some cases, the model monitor system may perform one or more integrity tests on a model and the results may be displayed on a model management console. For example, the integrity test result may show the number of failed predictions, percentage of row entries failed the test, execution time of the test, and details of each entry. Such results can be displayed to users (e.g., developers, manager, etc.) via the model management console.

Data monitored by the model monitor system may include data involved in model training and during production. The data at model training may comprise, for example, training, test and validation data, predictions, detections, or statistics that characterize the above datasets (e.g., mean, variance and higher order moments of the data sets). Data involved in production time may comprise time, input data, predictions made, and confidence bounds of predictions made. In some embodiments, the ground truth data may also be monitored. The ground truth data may be monitored to evaluate the accuracy of a model and/or trigger retraining of the model. In some cases, RTLS output data may be used to generate ground truth data to the predictive model creation and management system 430 after a model is in deployment phase. The model monitor system may monitor changes in data such as changes in ground truth data, or when new training data or prediction data becomes available.

The one or more trained predictive or detective models may be individually monitored or retrained if model performance is below a threshold or when new sensor data are available. During prediction time, predictions may be associated with the model in order to track data drift or to incorporate feedback from new ground truth data.

In some cases, the predictive or detective model creation and management system 430 may be configured to manage data flows among the various components (e.g., cloud data lake, metadata database, multimodal sensory systems, safety inference engine, model training module), provide precise, complex and fast queries (e.g., model query, training data query), model deployment, maintenance, monitoring, model update, model versioning, model sharing, and various others. For example, the deployment context may be different depending on edge infrastructure or the deployment environment (e.g., construction site) and the model manager may take into account the application manifest such as edge hardware specifications, deployment location, information about compatible systems, data-access manifest for security and privacy, emulators for modeling data fields unavailable in a given deployment and version management during model deployment and maintenance.

The trained or updated predictive or detective models may be stored in a model database 440. The model database may contain pre-trained or previously trained models (e.g., DNNs). Models stored in the model database may be monitored by the model monitor system as described above and continual trained or retrained after deployment. In some cases, upon the creation of a new predictive or detective model or an update/change made to an existing predictive or detective model, the predictive or detective model may be available to selected multimodal sensory system or multimodal safety systems. For instance, once a predictive model is updated and stored in the predictive model database 440, the predictive model may be downloaded to one or more multimodal sensory system or multimodal safety systems during operation. The available predictive or detective model may be downloaded or updated in the one or more selected multimodal sensory system or multimodal safety systems in a dynamic manner.

In some cases, such update, change or creation of a new model may be detected automatically by a component of the predictive or detective model creation and management system. For example, a predictive or detective model update module may be notified by the predictive or detective model database or the model training module when a new model is created or an existing model has been updated. The predictive or detective model update module may then select one or more multimodal sensory system or multimodal safety systems to receive a copy of the updated model. The predictive or detective model update component may also determine when the model is updated in the selected multimodal sensory system or multimodal safety systems. For instance, the predictive or detective model update component may determine that the model needs to be updated immediately, updated when the multimodal sensory system or multimodal safety systems is not in operation (e.g., during maintenance, etc.), or on an as-needed basis.

In some embodiments of the present disclosure, an automated data labeling engine 410 may be provided to generate label data 411. The automated data labeling engine 410 may generate label data using RTLS output data and/or IMU data which is used to train one or more predictive models of the computer vision system or the LIDAR system as described elsewhere herein. For example, the label data 411 may be generated according to the identity and location of an object provided by the RTLS component and the object is registered to the image data of the computer vision system or 3D point cloud data of the LIDAR system. Additionally, the label data 411 may be generated using data collected from the motion sensors or inertial measurement unit onboard the mobile tag device. For instance, the label data 411 may be generated using data about on a position, orientation or motion state (e.g., speed, acceleration, etc.) of an object carries the mobile tag device. In another example, the object identity and location data or motion data generated by the RTLS component may be registered to the 3D scene map generated by the computer vision system and 3D point clouds data generated by the LIDAR system.

The automated data labeling engine 410 may retrieve the abovementioned different types of sensor data (e.g., image data, 3D point cloud date, identity, location data, IMU data, motion data, etc.) from the data store 420, and perform data/image registration to create paired datasets. The data/image registration may be performed using various suitable methods such as intensity-based or feature-based methods, methods using known transformation models, similarity features-based method, and various other methods.

Although the automated data labeling engine is shown as separate component, it should be noted that the automated data labeling engine can be part of the predictive model creation and management system. In some cases, multiple components of the management system such as the automated data labeling engine, model training module, model monitor system, or model update module may be self-contained components that can be independently operated and worked in different use cases concurrently. Each of the components may be a hardware module, software module, or a combination of hardware and software modules.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A multimodal system for managing safety in an industrial environment, comprising:
   (a) a computer vision component for generating a computer vision output data based at least in part on an image data;
   (b) a real-time locating component for generating location data and identification data about an object within the industrial environment;
   (c) a light detection and ranging (LIDAR) component for generating a 3D point cloud data of the industrial environment; and (d) one or more processors coupled to the computer vision component, the real-time locating component and configured to:
  (i) generate a label data using the location data and the identification data about the object,
  (ii) create a first paired training dataset including the label data generated in (i) and the image data obtained by the computer vision component, and train a first models utilized by the computer vision component using the first paired training dataset,
  (iii) create a second paired training dataset including the label data generated in (i) and the 3D point cloud data, and train a second model utilized by the LIDAR component,
  (iv) receive an input feature data comprising new computer vision output data generated by the first model trained in (ii), new location data generated by the real-time locating component and new 3D point cloud data generated by the second model trained in (iii), and
  (v) process the input feature data using a machine learning algorithm trained model to generate a safety related result.

2. The multimodal system of claim 1, wherein the real-time locating component comprises one or more reference point devices deployed within the industrial environment to provide a coverage at least partially overlaps with a view of the computer vision component.

3. The multimodal system of claim 1, wherein the real-time locating component includes a mobile tag device deployed to the object.

4. The multimodal system of claim 3, wherein the mobile tag device comprises a motion sensor collecting motion data or orientation data about the object.

5. The multimodal system of claim 1, wherein the computer vision output data comprises a description of the industrial environment.

6. The multimodal system of claim 1, wherein the first paired training dataset is created by registering the identification data about the object to an object from the image data based at least in part on the location data.

7. The method of claim 1, wherein the computer vision output data comprises a description of the industrial environment.

8. The method of claim 1, wherein creating the first paired training dataset comprises registering the identification data about the object to an object identified from the image data based at least in part on the location data.

9. The multimodal system of claim 1, wherein the image data is acquired by one or more imaging devices deployed within the industrial environment with a first predetermined deployment.

10. The multimodal system of claim 9, wherein the real-time locating component comprises one or more reference point devices deployed within the industrial environment with a second predetermined deployment, and wherein the first predetermined deployment and the second predetermined deployment are selected to provide an overlap of coverage.

11. The multimodal system of claim 4, wherein the label data further comprises a motion or orientation about the object generated using the motion data or orientation data.

12. The multimodal system of claim 1, wherein the second paired training dataset is created by registering the identification data about the object to an object from the 3D point cloud data based at least in part on the location data.

13. A method for managing safety in an industrial environment comprising:
  (a) providing a computer vision component for generating a computer vision output data based at least in part on an image data;
  (b) providing a computer vision output data for generating location data and identification data about an object within the industrial environment;
  (c) providing a light detection and ranging (LIDAR) component for generating a 3D point cloud data of the industrial environment;
  (d) generating a label data using the location data and the identification data about the object;
  (e) creating a first paired training dataset including the label data generated in (d) and the image data obtained by the computer vision component, and training a first model utilized by the computer vision component using the first paired training dataset;
  (f) creating a second paired training dataset including the label data generated in (d) and the 3D point cloud data, and training a second model utilized by the LIDAR component;
  (g) receiving an input feature data comprising new computer vision output data generated by the first model trained in (e), new location data generated by the real-time locating component and new 3D point cloud data generated by the second model trained in (f); and
  (h) processing the input feature data using a machine learning algorithm trained model to generate a safety related result.

14. The method of claim 13, wherein the real-time locating component comprises one or more reference point devices deployed within the industrial environment to provide a coverage at least partially overlaps with a view of the computer vision component.

15. The method of claim 13, wherein the real-time locating component includes a mobile tag device deployed to the object.

16. The method of claim 15, wherein the mobile tag device comprises a motion sensor collecting motion data or orientation data about the object.

17. The method of claim 13, wherein the image data is acquired by one or more imaging devices deployed within the industrial environment with a first predetermined deployment.

18. The method of claim 17, wherein the real-time locating component comprises one or more reference point devices deployed within the industrial environment with a second predetermined deployment, and wherein the first predetermined deployment and the second predetermined deployment are selected to provide an overlap of coverage.

19. The method of claim 16, wherein the label data further comprises a motion or orientation about the object generated using the motion data or orientation data.

20. The method of claim 13, wherein the second paired training dataset is created by registering the identification data about the object to an object from the 3D point cloud data based at least in part on the location data.

* * * * *